Patented July 29, 1952

2,605,209

UNITED STATES PATENT OFFICE 2,605,209

SOLUTIONS OF BARBITURIC COMPOUNDS

Malcolm D. Bray, Noblesville, Ind., assignor to Eli Lilly and Company, Indianapolis, Ind., a corporation of Indiana No Drawing. Application November 3, 1950, Serial No. 194,034

6 Claims. (Cl. 167—52)

This is a continuation-in-part of U. S. patent application Serial No. 124,248 filed October 28, 1949, now abandoned.

My invention relates to stable aqueous solutions of barbituric acids and their salts.

Barbituric acids and their salts are important as anesthetic and hypnotic agents. In addition to oral administration of the barbituric compounds in the form of capsules or tablets, an important use is their parenteral administration by injection for surgical anesthesia, for which aqueous solutions of the barbituric acid salts have been employed.

It is known that barbiturate salts are unstable in aqueous solution and that the salts decompose upon standing in such solutions and throw down a precipitate. Hence, the barbiturate salts cannot be supplied to the trade in the form of aqueous solutions ready for parenteral administration since the period elapsing between their manufacture and their use is sufficiently lengthy to permit an appreciable decomposition of the barbiturate and the deposition of a relatively large amount of precipitate. The barbituric acids themselves have been unsuitable for the preparation of aqueous solutions, since not only do the barbituric acids suffer the degradative changes undergone by the salts, but in addition are too slightly soluble in water to permit the preparation of water solutions having a therapeutically useful concentration of dissolved barbituric acid. Consequently, it has been the required practice to supply barbiturates for parenteral administration in the form of a dual package consising of an ampoule of a dry barbituric acid salt, and an ampoule of water to be used for dissolving the barbiturate immediately prior to its therapeutic administration. The obvious disadvantages of such procedure have for many years given rise to a desire on the part of the pharmaceutical trade to discover stable aqueous solutions of barbituric acid salts.

I have now discovered that stable aqueous solutions of barbituric compounds, i. e., barbituric acids and salts of barbituric acids, are obtained by providing compositions comprising essentially the barbituric acids or their salts dissolved in a mixture of water and a polyalkylene glycol. The solutions are quite stable, and accelerated aging tests have indicated that they possess a stability of many years duration. More surprisingly, I have found the solutions are sufficiently stable to permit their sterilization by heating in boiling water, or even autoclaving at a temperature of about 125° C. The advantages of such solutions are apparent since a stability of this nature not only permits the anesthetic to be marketed in a form suitable for immediate use, but also permits the ready sterilization of the finished ampoules and thus avoids the disadvantages attending the manufacture and filling of ampoules under absolutely sterile techniques.

In providing my novel solutions of barbituric compounds, I simply dissolve the barbituric compound in a mixture of water and the polyalkylene glycol. Alternatively, solutions of the barbituric acid salts can be obtained by dissolving the salt in water and adding thereto the polyalkylene glycol, and solutions of the barbituric acids are obtained by dissolving the acid in the polyalkylene glycol and adding the required amount of water. Solutions so prepared are filled and sealed into ampoules, and sterilized by standard methods, such as by successive heatings in boiling water or by heating in an autoclave.

Specific examples of solutions employing my invention are given below. In the examples the amounts of the ingredients employed are expressed in parts by weight.

Example 1

An aqueous composition containing about 5 percent on a weight-volume basis of calcium isoamyl-ethyl-barbiturate is obtained by mixing the ingredients listed below in the quantities given:

| | Parts |
|---|---|
| Calcium isoamyl-ethyl-barbiturate | 5 |
| Water | 33 |
| "Carbowax" 4000 | 75 |

When the parts by weight given above are chosen in grams, the aqueous solution has a total volume of 100 ml. and each ml. of solution contains about 50 mg. of sodium isoamyl-ethyl-barbiturate.

Example 2

An aqueous composition containing about 5 percent on a weight-volume basis of isoamyl-ethyl-barbituric acid is obtained by dissolving the barbituric acid in a mixture of water and polyethylene glycol 600 in the proportions given below:

| | Parts |
|---|---|
| Isoamyl-ethyl-barbituric acid | 5 |
| Water | 33 |
| Polyethylene glycol 600 | 75 |

Example 3

An aqueous composition containing 5 percent on a weight-volume basis of ammonium propyl-methylcarbinyl-allyl-barbiturate is as follows:

| | Parts |
|---|---|
| Ammonium propylmethylcarbinyl-allyl barbiturate | 5 |
| Water | 45 |
| Polyethylene glycol 600 | 56.6 |

*Example 4*

In place of the ammonium propylmethylcarbinyl-allyl-barbiturate used in Example 3, the barbituric acid can be employed in the same proportion to give a stable solution of propylmethylcarbinyl-allyl-barbituric acid.

*Example 5*

An aqueous composition containing about 2.5 percent on a weight-volume basis of sodium ethyl-(1-methylbutyl)-thiobarbiturate is as follows:

| | Parts |
|---|---|
| Sodium ethyl-(1-methylbutyl)-thiobarbiturate | 2.5 |
| Water | 45 |
| "Carbowax" 1500 | 58 |

*Example 6*

An aqueous composition containing about 5 percent on a weight-volume basis of potassium ethyl-(1-methylbutyl)-barbiturate is as follows:

| | Parts |
|---|---|
| Potassium ethyl-(1-methylbutyl)-barbiturate | 5 |
| Water | 45 |
| Polyethylene glycol 600 | 56.6 |

*Example 7*

An aqueous composition containing about 3 percent on a weight-volume basis of sodium 5-ethyl-5-(methyl-1-butenyl)-barbiturate is as follows:

| | Parts |
|---|---|
| Sodium 5-ethyl-5-(methyl-1-butenyl)-barbiturate | 3 |
| Water | 45 |
| Polyethylene glycol 600 | 59.8 |

*Example 8*

An aqueous composition containing about 5 percent on a weight-volume basis of sodium 5-n-amyl-5-ethylbarbiturate is as follows:

| | Parts |
|---|---|
| 5-n-amyl-5-ethylbarbituric acid | 5 |
| Polyethylene glycol 200 | 50 |
| 50 percent aqueous sodium hydroxide solution | 1.5 |
| Water q. s. | 100 |

*Example 9*

An aqueous composition containing sodium propylmethyl-carbinyl-allylbarbiturate is prepared in the same proportions as those given in Example 8, starting with 5-propylmethylcarbinyl-5-allylbarbituric acid.

*Example 10*

An aqueous composition of sodium spiro(2-ethyl-3,5-dimethylcyclopentane)-2'-thiobarbiturate is as follows:

| | Parts |
|---|---|
| Sodium spiro(2-ethyl-3,5-dimethylcyclopentane)-2'-thiobarbiturate | 2.5 |
| Water | 10 |
| Polyethylene glycol 200 | 30 |
| Water q. s. | 100 |

The above aqueous compositions are characterized by an exceptional stability and an ability to withstand without decomposition, sterilization by methods employing heat.

For illustrative purposes, the polyalkylene glycols employed in the above examples are polyethylene glycols available to the trade under the generic name polyethylene glycol, or "Carbowax," the latter term being employed for the polyethylene glycols of higher molecular weight. The numeral appearing in the designation of the polyethylene glycol refers to the average molecular weight of the glycol.

The amount of polyalkylene glycol required for stability of the aqueous barbiturate salt solution varies to a degree depending upon the innate stability of the barbiturate. Generally speaking, aqueous solutions of barbituric compounds (i. e., salts and acids) containing about 30 to about 50 percent by volume of polyalkylene glycol are stable over long periods of time and possess a sufficient degree of stability that permits their sterilization by heat. However, with certain of the barbituric compounds of pronounced instability, such as for example isoamyl-ethyl-barbituric acid and its salts, it is preferable to employ a relatively larger proportion of polyalkylene glycol in the aqueous solution, and with these less stable barbituric compounds solutions containing up to about 75 percent of polyalkylene glycol should be employed to obtain a high degree of stability.

The polyalkylene glycols useful for the purpose of my invention may vary widely in their degree of polymerization as measured or expressed by the average molecular weight of the polyalkylene glycol. Thus, polyalkylene glycols whose degree of polymerization is such that their average molecular weights range from 200 to about 4,000 are quite satisfactory for the purpose of my invention. Referring again to the commercially available polyethylene glycols of the "Carbowax" series for illustrative purposes, members of this series from polyethylene glycol 200 to "Carbowax" 4000 are satisfactory in providing stable barbiturate solutions. Polyalkylene glycols of average molecular weight greater than 4000 are capable of providing stable compositions, but are less desirable for the purpose of this invention since the solutions possess a relatively great viscosity and are therefore less easily administered parenterally.

The barbituric acids and salts employed in my invention are those having therapeutic usefulness as hypnotic agents. Many of such compounds are known to the art. The sodium salts of the barbituric acids are the compounds which have hitherto been most extensively employed in the therapeutic field, but other salts such as the potassium, calcium, magnesium and ammonium salts are also efficacious therapeutic agents and can be employed in my invention. Furthermore, as pointed out hereinabove, by means of my invention the barbituric acids themselves can be employed for parenteral administration. The use of solutions of the barbituric acids avoids the disadvantageously high pH exhibited by water solutions of the barbituric acid salts.

I claim:

1. An injectable therapeutic composition comprising essentially a therapeutically useful barbituric compound of the class consisting of a barbituric acid and its salt, dissolved in an aqueous composition consisting of water and from about 30 to about 75 percent of a polyalkylene glycol having an average molecular weight within the range of about 200 to about 4000.

2. An injectable therapeutic composition comprising essentially a therapeutically useful barbituric acid dissolved in an aqueous composition consisting of water and from about 30 to about 75 percent of a polyalkylene glycol having an average molecular weight within the range of about 200 to about 4000.

3. An injectable therapeutic composition comprising essentially a therapeutically useful salt of a barbituric acid dissolved in an aqueous composition consisting of water and from about 30 to about 75 percent of a polyalkylene glycol having an average molecular weight within the range of about 200 to about 4000.

4. An injectable therapeutic composition comprising essentially sodium isoamyl-ethyl-barbiturate dissolved in an aqueous composition of water and from about 30 to about 75 percent polyethylene glycol having an average molecular weight within the range of about 200 to about 4000.

5. An injectable therapeutic composition comprising essentially sodium ethyl-(1-methylbutyl)-thiobarbiturate dissolved in an aqueous composition of water and from about 30 to about 75 percent of polyethylene glycol having an average molecular weight within the range of about 200 to about 4000.

6. An injectable therapeutic composition comprising essentially sodium propylmethylcarbinylallyl barbiturate dissolved in an aqueous composition of water and from about 30 to about 75 percent of polyethylene glycol having an average molecular weight within the range of about 200 to about 4,000.

MALCOLM D. BRAY.

REFERENCES CITED

The following references are of record in the file of this patent:

UNITED STATES PATENTS

| Number | Name | Date |
| --- | --- | --- |
| 2,149,005 | Bockmuhl | Feb. 28, 1939 |

OTHER REFERENCES

Friesen: Pharmazie, July 1946, pages 76 to 79 (167–69). (Copy in Division 43.)

Middendorf: Medizin und Chemie (1942), pages 573 to 575 (167–82). (Copy in Division 43.)

Nimrodette: Perfume and Essential Oil Record, June 1948, pages 179 to 183 (167–82). (Copy in Division 43.)

McClelland: Chemical and Engineering News, volume 23, February 10, 1945 (copy in Scientific Library), pages 247 to 251 (167–63).